United States Patent
Gupta et al.

(10) Patent No.: US 7,801,934 B2
(45) Date of Patent: Sep. 21, 2010

(54) POINTER GENERATION METHOD AND APPARATUS FOR DELAY COMPENSATION IN VIRTUAL CONCATENATION APPLICATIONS

(75) Inventors: Sameer Gupta, Round Rock, TX (US); Himanshu Mahendra Thaker, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 811 days.

(21) Appl. No.: 10/420,153

(22) Filed: Apr. 22, 2003

(65) Prior Publication Data

US 2004/0213299 A1    Oct. 28, 2004

(51) Int. Cl.
*G06F 15/16*     (2006.01)

(52) U.S. Cl. .................. 708/200; 709/203; 709/231; 709/232; 370/476; 370/516; 370/517; 370/518; 370/519

(58) Field of Classification Search .......... 709/203, 709/231–232; 370/476, 516–519
See application file for complete search history.

(56) References Cited

U.S. PATENT DOCUMENTS

| | | | | |
|---|---|---|---|---|
| 6,526,674 B1 * | 3/2003 | Fielding et al. | ................ | 34/80 |
| 6,592,407 B2 * | 7/2003 | Korunsky et al. | ........... | 439/637 |
| 6,594,329 B1 * | 7/2003 | Susnow | ...................... | 375/372 |
| 6,678,813 B1 * | 1/2004 | Le | ............................. | 711/172 |
| 6,700,900 B1 * | 3/2004 | Turban | ...................... | 370/465 |
| 6,842,787 B2 * | 1/2005 | Stadler et al. | ............... | 709/231 |
| 6,862,298 B1 * | 3/2005 | Smith et al. | .................. | 370/516 |
| 6,975,649 B1 * | 12/2005 | Roberts et al. | ............. | 370/470 |
| 7,184,442 B1 * | 2/2007 | Roos | ........................... | 370/412 |
| 2002/0007429 A1 * | 1/2002 | Boulandet et al. | ............. | 710/52 |
| 2002/0012141 A1 * | 1/2002 | Traverso | .................... | 359/124 |
| 2002/0080823 A1 * | 6/2002 | Wolf et al. | ................. | 370/503 |
| 2003/0099231 A1 * | 5/2003 | Betts et al. | .................. | 370/369 |
| 2004/0047367 A1 * | 3/2004 | Mammen | .................... | 370/472 |

OTHER PUBLICATIONS

Klein et al. , Network Synchronization—A challenge for SDH/SONET, IEEE Communications Magazine, Sep. 1993.*
Sari et al. , cancellation of Pointer Adjustment Jitter in SDH Networks, IEEE Transactions on Communications, Dec. 1994.*
Hamlin, Jr. et al. , A SONET/SDH Overhead Terminator for STS-3, STS-3C, and STM-1, IEEE J. of Solid State Circuits, Mar. 1993.*
Owen et al., Simulation of Pointer Activity in Synchronous Digital Heirarchy Networks, IEEE, 1993.*
D. Cavendish et al., "New Transport Services for Next-Generation SONET/SDH Systems," IEEE Communications Magazine, pp. 80-87, May 2002.
S.S. Gorshe et al., "Transparent Generic Framing Procedure (GFP): A Protocol for Efficient Transport of Block-Coded Data through SONET/SDH Networks," IEEE Communications Magazine, pp. 88-95, May 2002.

* cited by examiner

*Primary Examiner*—Duyen M Doan
(74) *Attorney, Agent, or Firm*—Ryan, Mason & Lewis, LLP

(57) ABSTRACT

Virtual concatenation circuitry is disclosed for implementation in a network element of a data communication network. The virtual concatenation circuitry in a preferred embodiment is operative: (i) to maintain, for each of the individual member streams of a virtual concatenation stream, a corresponding counter which tracks pointer adjustments for that member stream; and (ii) to generate pointers based on values of the counters so as to substantially equalize incoming and outgoing pointer adjustments for the member streams at the network element.

17 Claims, 3 Drawing Sheets

POINTER GENERATION METHOD AND APPARATUS FOR DELAY COMPENSATION IN VIRTUAL CONCATENATION APPLICATIONS

RELATED APPLICATION(S)

The present invention is related to the invention described in U.S. patent application Ser. No. 10/420,156, entitled "Stall Need Detection and Associated Stall Mechanism for Delay Compensation in Virtual Concatenation Applications," which is filed concurrently herewith and incorporated by reference herein.

FIELD OF THE INVENTION

The present invention relates generally to data communication networks, and more particularly to virtual concatenation techniques for use in such networks.

BACKGROUND OF THE INVENTION

Certain data communication networks, such as those based on the well-known synchronous optical network (SONET) or synchronous digital hierarchy (SDH) standards, can be configured to utilize a technique known as virtual concatenation. The SONET standard is described in Bellcore standards document GR-253 and ANSI standards document T1.105, both of which are incorporated by reference herein. The SDH standard is described in ITU-T standards document G.707, which is incorporated by reference herein.

In general, virtual concatenation allows a given data communication channel, also referred to as a virtual concatenation (VC) data stream, to be split into several smaller streams, commonly referred to as VC member streams. The set of VC member streams associated with a given VC data stream is also referred to as a virtually concatenated group (VCG) or a VC group. Each of the VC member streams can travel along a different path from a source node to a destination node. As a result, the different member streams typically experience different delays in transit from the source node to the destination node. Upon arrival at the destination node, the individual member streams are recombined into the original VC stream. This splitting and recombining of data traffic is designed to be completely invisible to the transmitting or receiving end users, and allows for a particularly efficient utilization of network bandwidth.

However, this bandwidth efficiency is obtained at the price of increased algorithmic complexity. In particular, the recombining of the individual VC member streams at the destination node requires special care. For example, the destination node must account for the fact that these individual member streams are likely to have encountered different delays along their respective paths. Furthermore, these delays may not be fixed, due to slight variations in the SONET clocks in the various paths. A process known as differential delay compensation is used to realign the individual member streams.

Virtual concatenation in the SONET context is defined in greater detail in the ANSI T1.105-199x standards document, which is part of the above-cited T1.105 document.

Additional details regarding conventional aspects of virtual concatenation can be found in, for example, D. Cavendish et al., "New Transport Services for Next-Generation SONET/SDH Systems," IEEE Communications Magazine, pp. 80-97, May 2002, which is incorporated by reference herein.

A significant problem with conventional virtual concatenation techniques as described in the foregoing documents is that the differential delay compensation process can in certain circumstances lead to undesirable overflow or underflow conditions in the data buffers used for differential delay compensation at the destination node. This can result in excessive errors in a corresponding network-based communication system.

It is therefore apparent that a need exists for improved delay compensation in virtual concatenation applications.

SUMMARY OF THE INVENTION

The invention provides improved techniques for pointer generation in conjunction with virtual concatenation in a data communication network.

In accordance with one aspect of the invention, virtual concatenation circuitry in a network element of a data communication network is operative: (i) to maintain, for each of the individual member streams of a virtual concatenation stream, a corresponding counter which tracks pointer adjustments for that member stream; and (ii) to generate pointers based on values of the counters so as to substantially equalize incoming and outgoing pointer adjustments for the member streams at the network element.

In an illustrative embodiment of the invention, a reset value is established for the pointer adjustment counters. The reset value is denoted R and is generally determined as a function of N, where $N=2^n$, and n is a function of clock frequency variation and allowable drift in at least a portion of the network. For example, R may be set to a value such as $N/2$ or $(N/2)-1$ in the illustrative embodiment. The counter for a given one of the plurality of member streams is preferably incremented each time that stream has an incoming pointer increment, and decremented each time that stream has an incoming pointer decrement. When the counter values for the member streams are all greater than the reset value R, an associated outgoing pointer is incremented and the corresponding counter values for the member streams are all decremented. Similarly, when the counter values for the member streams are all less than the reset value R, an associated outgoing pointer is decremented and the corresponding counter values for the member streams are all incremented.

Advantageously, the invention can alleviate or eliminate overflow and underflow conditions in the data buffers used for differential delay compensation in a virtual concatenation application, thereby improving the error performance of a corresponding network-based communication system.

DETAILED DESCRIPTION OF THE INVENTION

The invention will be illustrated herein in conjunction with a network-based communication system which operates in accordance with the SONET standard. More specifically, the invention will be illustrated in the context of a network element or other processing device configured to re-package a given SONET VC data stream into a delay compensated SONET VC data stream. A delay compensated SONET VC data stream is also referred to herein as an "aligned" stream. It should be understood, however, that the invention is more generally applicable to any virtual concatenation application in which improved performance is desired, including synchronous or plesiochronous applications involving SONET, SDH or other standards, as well as non-standard applications. The present invention is therefore not limited to use with any particular network standard or configuration. The particular network element arrangements shown herein should therefore be understood to represent illustrative examples only.

Figure 1:
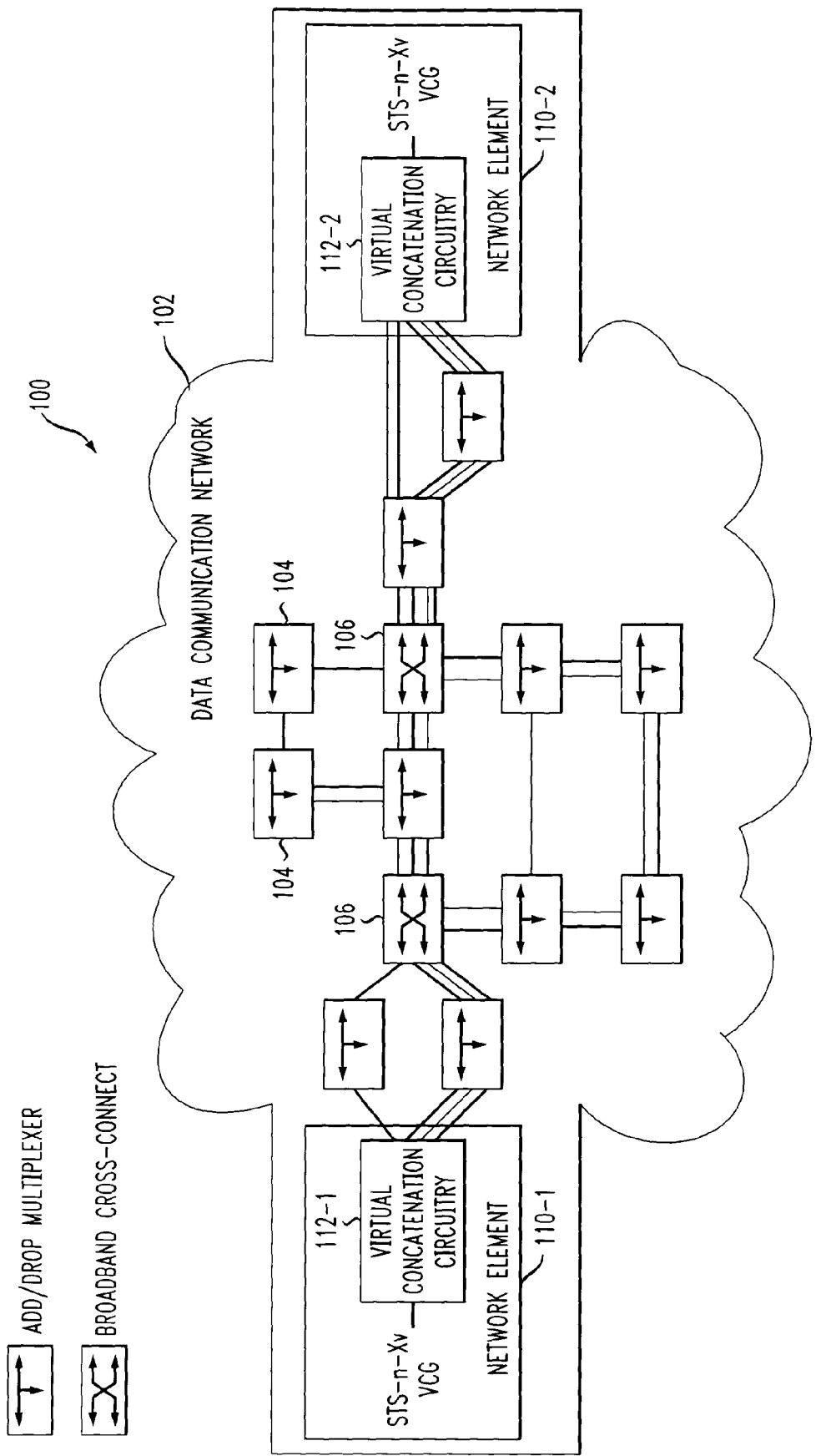
FIG. 1 is a simplified block diagram of an example network-based communication system in which the present invention is implemented.

FIG. 1 shows a network-based communication system 100 which comprises a data communication network 102 configured in accordance with an illustrative embodiment of the invention. The network 102 includes a number of add/drop multiplexers 104 and broadband cross-connects 106, arranged as shown. Also associated with the network 102 are first and second network elements 110-1 and 110-2, respectively. The network elements 110-1 and 110-2 include respective sets of virtual concatenation circuitry 112-1 and 112-2.

In this illustrative embodiment, the virtual concatenation circuitry is configured to process a virtual concatenation stream comprising an STS-n-Xv virtually concatenated group (VCG). The STS-n-Xv stream is a group of X member streams each at an STS-n rate, where STS denotes "synchronous transport signal." It should be noted that the variable "n" as used in this context is unrelated to the variable n used in the description of pointer adjustment counters elsewhere herein. The virtual concatenation circuitry may also or alternatively process other types of virtual concatenation streams, and the invention is not limited in this regard.

The network elements 110-1, 110-2 are examples of elements more generally referred to herein as "processing devices." A given processing device generally includes a processor and an associated memory, and may be illustratively implemented as one or more integrated circuits. The processor may comprise, by way of example and without limitation, a microprocessor, a central processing unit (CPU), an application-specific integrated circuit (ASIC), or other type of data processing device, as well as portions and combinations of these and other devices. Similarly, the memory may include electronic memory as well as other types of storage devices, or portions or combinations thereof.

More particularly, a network element of the system 100 may represent a cross-connect or other type of switch, a server, a gateway, a computer, a wireless terminal, a mobile telephone, a personal digital assistant (PDA), a terminal multiplexer, an add/drop multiplexer, or any other type of element connectable to or configurable within the network 102, as well as portions or combinations of such elements.

A given network element may also be referred to herein as a network node, or more particularly as a source node or a destination node.

The virtual concatenation circuitry 112 provides virtual concatenation functionality in the system 100 utilizing the techniques of the invention, as will be described in greater detail below in conjunction with FIGS. 2, 3 and 4. This virtual concatenation functionality may be implemented at least in part in the form of one or more software programs which are stored in a memory of an associated network element and executed in a processor of that network element.

The term "virtual concatenation circuitry" as used herein is therefore intended to include any portion of a processor or other type of processing logic circuitry which is capable of performing at least a portion of a virtual concatenation operation in accordance with the techniques of the invention.

It should be understood that the particular arrangement of system elements shown in FIG. 1 is by way of illustrative example only. That is, the system need not include the particular arrangement of elements 104, 106 and 110 shown in the figure. These elements may be replaced with other elements of a type commonly used in otherwise conventional virtual concatenation applications, as will be readily appreciated by those skilled in the art.

In addition, the particular interconnections shown in the figure between network elements 110, add/drop multiplexers 104 and broadband cross-connects 106 illustrate one possible example of the routing of traffic among these elements, but data traffic can be routed through the network 102 in many other ways. Generally, thinner lines between network elements in the figure may correspond to one or more individual member streams of a VC stream that is itself denoted by a thicker line.

In accordance with one aspect of the invention, the virtual concatenation circuitry of a given network element maintains, for each of a plurality of member streams of a VC stream, a corresponding counter which tracks pointer adjustments for that member stream. Furthermore, the virtual concatenation circuitry generates pointers based on values of the counters so as to substantially equalize incoming and outgoing pointer adjustments for the member streams at the network element.

The term "pointer" as used herein is intended to include, by way of example and without limitation, information indicating the start of user data within a fixed communication frame structure. More particular examples are described in the above-cited GR-253, T1.105 and G.707 documents.

As noted above, a significant problem with conventional virtual concatenation techniques is that the differential delay compensation process can in certain circumstances lead to undesirable overflow or underflow conditions in the data buffers used for differential delay compensation at a given network element, possibly leading to excessive errors in the system.

Once a destination network element has realigned the individual member streams, it may process the data and thereby terminate the data path, or repackage the data into a new stream and send it to a downstream network element for further processing.

If the data is repackaged into a new stream, it may be sent out as an aligned VC stream, made up of individual member streams, or as a pure concatenated stream as defined in the above-cited GR-253, T1.105 and G.707 documents.

We have recognized that, in either of these latter two cases, there is a subtle interaction between the conventional differential delay compensation process and network clock frequency variation and jitter that can cause the conventional differential delay compensation process to fail over time. The present invention provides improved delay compensation techniques which in an illustrative embodiment overcome this problem.

Figure 2:
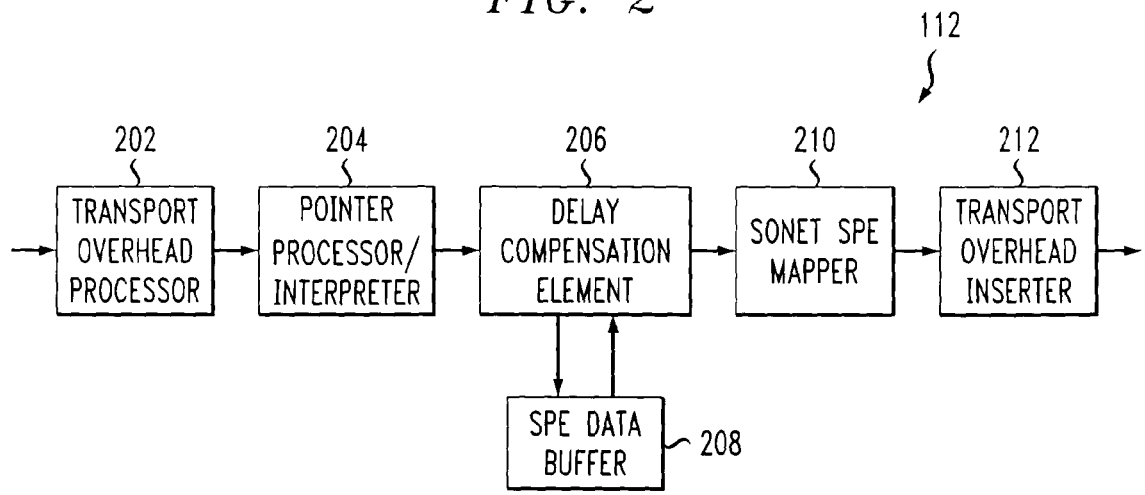
FIG. 2 shows an example of virtual concatenation circuitry in an illustrative embodiment of the invention.

FIG. 2 shows an example of virtual concatenation circuitry 112 in a SONET application which the invention is implemented. The virtual concatenation circuitry 112 includes a transport overhead processor 202, a pointer processor/interpreter 204, a delay compensation element 206, a synchronous payload envelope (SPE) data buffer 208, a SONET SPE mapper 210, and a transport overhead inserter 212. It should be noted that these particular elements are exemplary only, and should not be viewed as requirements of virtual concatenation circuitry in accordance with the invention. Moreover, alternative embodiments of virtual concatenation circuitry used to implement the present invention may include elements not explicitly shown in the figure.

The transport overhead processor 202 terminates section and line overhead bytes and forwards an incoming data stream to the pointer processor/interpreter 204.

The pointer processor/interpreter 204 transfers the data from the incoming clock domain to the system clock domain, and identifies the payload. The latter function generally necessitates pointer interpretation.

The SONET SPE mapper 210 is responsible for repackaging the data into a SONET payload.

The transport overhead inserter 212 fills in the section and line overhead bytes appropriately.

The elements 202, 204, 210 and 212 thus operate in a manner substantially similar to corresponding elements of conventional virtual concatenation circuitry. Those skilled in the art are familiar with the operation of such conventional elements, and elements 202, 204, 210 and 212 will therefore not be described in further detail herein.

The present invention in the illustrative embodiment is more particularly implemented in elements 206 and 208 of the FIG. 2 virtual concatenation circuitry, as will be described in conjunction with FIGS. 3 and 4.

Figure 3:
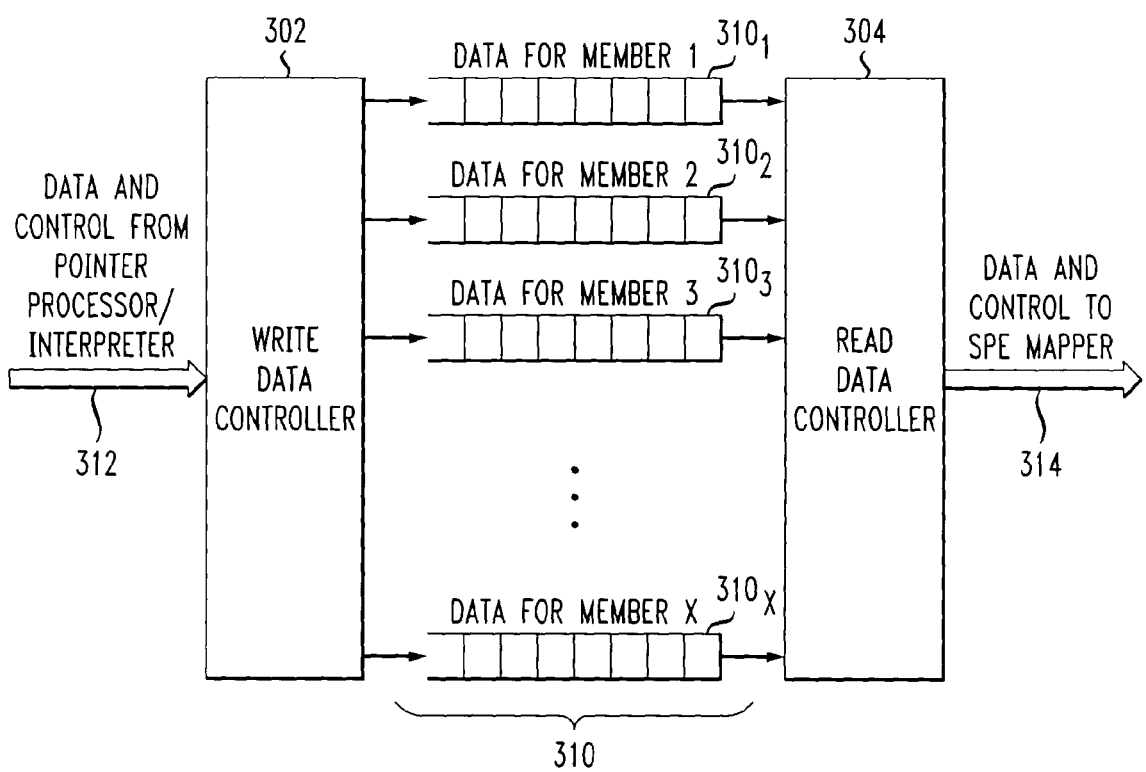
FIG. 3 shows delay compensation and data buffer elements of the FIG. 2 virtual concatenation circuitry.

With reference initially to FIG. 3, the delay compensation element 206 and data buffer 208 are shown. The delay compensation element 206 comprises a write data controller 302 and a read data controller 304. The data buffer 208 comprises a set of buffers 310 having a first-in first-out (FIFO) buffer $310_i$, i=1, 2, ... X, for each of a plurality of member streams 1, 2, ... X. A given one of the FIFO buffers $310_i$ is coupled between a corresponding data output of the write data controller 302 and a corresponding data input of the read data controller 304.

The write data controller 302 receives data and control information from the pointer processor/interpreter 204 via input 312. The read data controller 304 delivers data and control information to the SONET SPE mapper 210 via output 314.

The write data controller 302 is responsible for storing the SPE data from each VC member stream in the corresponding FIFO buffer $310_i$ and performing conventional error checking operations such as H4 byte integrity, missed multi-frame indicator (MFI) frames, etc.

The read data controller 304 reads the SPE data out of the FIFO buffers and sends it to the SONET SPE mapper 210. In addition, the read data controller 304 performs error monitoring operations such as making sure that differential delay is within acceptable limits, etc.

It should be noted that this particular delay compensation element and data buffer configuration is presented by way of example only, and that the present invention does not require the use of the particular arrangement shown.

The SONET/SDH standards as described in the above-cited GR-253, T1.105 and G.707 documents have strict specifications on clocking requirements, and define a mechanism for dealing with clock frequency differences and clock boundary transfers. As is understood by those skilled in the art, this conventional mechanism uses H1, H2 pointer adjustments, that is, pointer increments and decrements, to deal with issues such as plesiochronous clock boundary transfers and frequency mismatches.

Virtual concatenation adds layer of complexity in this process by allowing the individual members of VC stream to take different paths from a source node to a destination node. Therefore, a data communication application that involves repackaging VC data traffic into a new SONET stream must account for the following two issues relating to pointer adjustments: (1) clock frequency differences between source and destination nodes; and (2) pointer adjustments occurring at different times.

With regard to issue (1) above, any difference in the clock frequency in a conventional arrangement will cause an aggregate bandwidth mismatch. For example, if the source node clock frequency is greater than the destination node clock frequency, the bandwidth of the incoming SONET stream will be higher than the outgoing SONET stream. Conversely, if the source node clock frequency is less than the destination node clock frequency, the bandwidth of the incoming SONET stream will be lower than the outgoing SONET stream.

In a conventional arrangement, the above-noted H1, H2 pointer adjustments are used to attempt to control the bandwidth mismatch. More specifically, in the first case (source node clock frequency greater than destination node clock frequency), the output of the pointer processor/interpreter 204 will include periodic pointer decrements. Similarly, in the second case (source node clock frequency less than destination node clock frequency), the output of the pointer processor/interpreter 204 will include periodic pointer increments.

However, it should be noted that the source and destination frequencies may not have a consistent relationship with respect to each other, that is, frequency drift over time may cause the source node clock frequency to be greater or lesser than the destination node clock frequency.

With regard to issue (2) above, since individual members of a VC stream may be diversely routed, they are likely to experience pointer adjustment at unpredictable and different times.

Failure to account properly for the above-noted issues relating to pointer adjustment can result in bandwidth mismatch in the incoming and outgoing SONET data streams at a given network element. This bandwidth mismatch in turn can cause the SPE data buffers either to overflow (if the source node clock frequency is greater than the destination node clock frequency) or to underflow (if the destination node clock frequency is greater than the source node clock frequency). An overflow/underflow condition cannot be avoided simply by increasing the size of the SPE data buffers, in that the size of the data buffer only controls the frequency of error. In other words, given a finite buffer size, there is a non-zero probability of a buffer overflow/underflow condition.

The conventional delay compensation process mentioned previously is deficient in that it fails to account properly for the pointer adjustment related issues identified above.

The illustrative embodiment of the invention overcomes this deficiency of the prior art by providing a pointer generation algorithm that is implemented utilizing the delay compensation element 206 and data buffer 208 of the virtual concatenation circuitry 112, as will be described below in conjunction with FIG. 4. This aspect of the invention is based at least in part on the recognition that the bandwidth mismatch described above manifests itself in the form of pointer adjustments and that the frequency of the pointer adjustments is directly proportional to the magnitude of the frequency mismatches.

Figure 4:
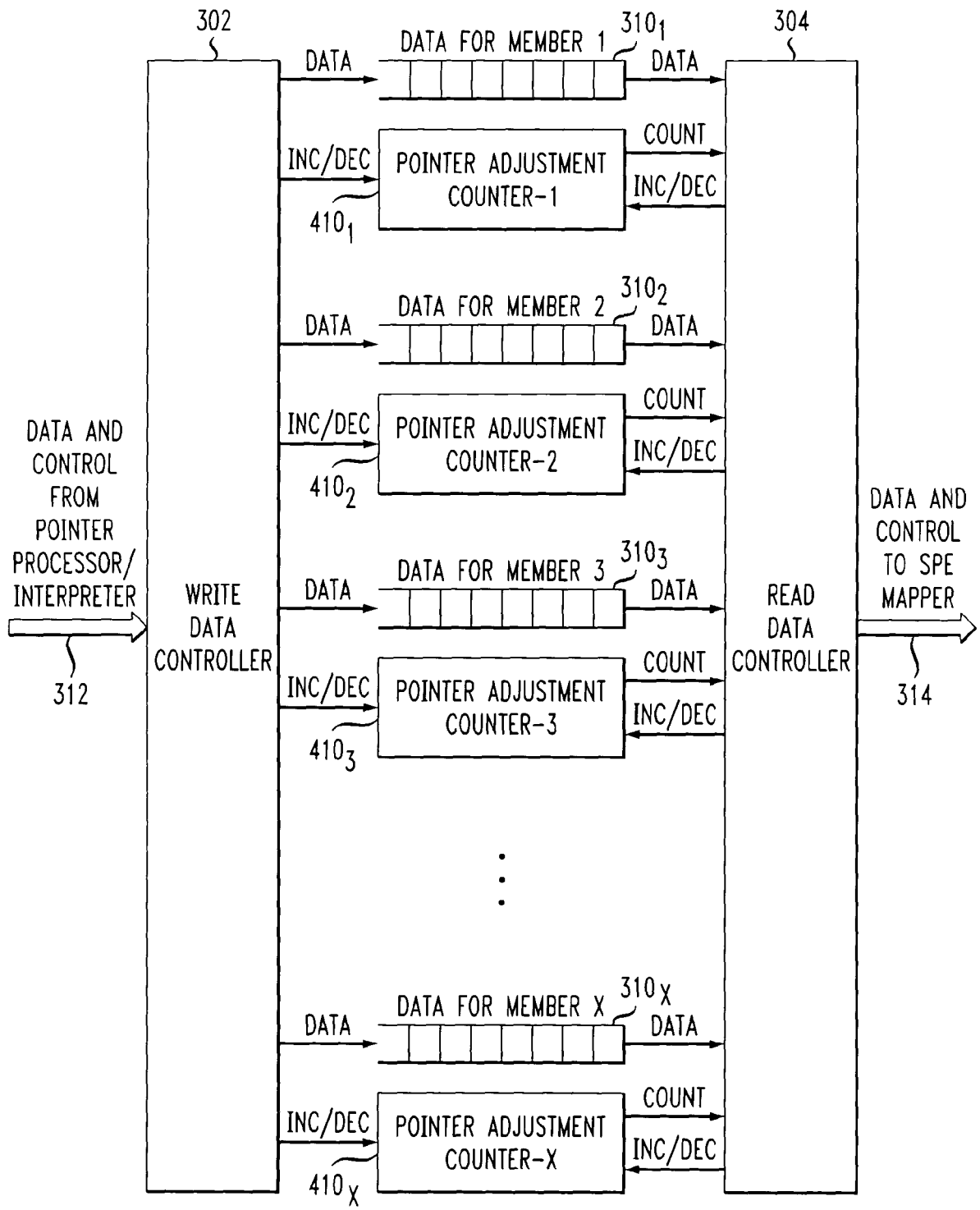
FIG. 4 shows a more detailed view of the delay compensation and data buffer elements of the FIG. 2 virtual concatenation circuitry, illustrating an example implementation of a set of pointer adjustment counters in accordance with the invention.

FIG. 4 shows a more detailed view of the FIG. 3 virtual concatenation circuitry, illustrating a set of pointer adjustment counters $410_1, 410_2, \ldots 410_X$. Each of the counters $410_i$, i=1, 2, ... X, is associated with a corresponding one of the individual members of a given VC stream. Each of the counters in this embodiment is coupled between a counter control output of the write data controller 302 and a count input of the read data controller 304. The counter control output more specifically comprises an increment/decrement signal which controls incrementing and decrementing of the corresponding counter. Each of the counters in this embodiment is also coupled to a counter control output of the read data controller. Like the counter control output of the write data controller, the counter control output of the read data controller more specifically comprises an increment/decrement signal which controls incrementing and decrementing of the corresponding counter.

Preferably, each of the pointer adjustment counters comprises an n-bit counter, where n is dependent on the maximum clock frequency variation and drift allowed in at least a relevant portion of the network, typically including any intermediate nodes on diversely-routed streams. Other counter sizes may be used in alternative embodiments.

The operation of the example pointer generation algorithm, as implemented in the FIG. 4 circuitry, is as follows.

A reset value R is established for each of the counters, where R is a function of N, and where $N=2^n$. More particularly, R may be defined in the illustrative embodiment as (N/2)−1 or N/2. Other reset values can also be used. By way of example, the value n may be less than or equal to a value of about 12.

Preferably, a given pointer adjustment counter is initialized to the value R when the corresponding individual stream member is added to the group comprising the VC stream, although other initialization techniques can be used.

Every time an incoming stream has a pointer increment, the corresponding counter for the stream is incremented by the write data controller.

Every time an incoming stream has a pointer decrement, the corresponding counter for the stream is decremented by the write data controller.

When the counter values for all individual members of a given VC stream are each greater than the reset value R, the read data controller 304 signals the SONET SPE mapper 210 to increment the pointer on the outgoing SONET stream, and each of the pointer adjustment counters is decremented by the read data controller. Similarly, when the counter values for all individual members of a given VC stream are each less than the reset value R, the read data controller 304 signals the SONET SPE mapper 210 to decrement the pointer on the outgoing SONET stream, and each of the pointer adjustment counters is incremented by the read data controller.

This algorithm ensures that the net pointer adjustments in the incoming and outgoing SONET stream are substantially equalized over time. This equalization of pointer adjustments in turn ensures that the incoming data bandwidth is substantially equal to the outgoing data bandwidth and thereby prevents overflows or underflows in the SPE data buffer 208.

An alternative version of the above-described algorithm can be implemented by reversing the counter increment and decrement operations in each of the steps, that is, replacing counter increments with counter decrements and vice-versa throughout the algorithm.

In other alternative versions, operations which are described as occurring "every time" or with similar language in the above description of the example algorithm may alternatively be configured so as to occur less than every time, for example, certain increments or decrements could be periodically skipped. Other variations of a similar type may be made in the example algorithm, as will be appreciated by those skilled in the art.

The write data controller 302 and read data controller 304 may be implemented as otherwise conventional controllers modified in a straightforward manner to include appropriate logic for implementing the above-described algorithm. Numerous suitable arrangements of such processing logic will be readily apparent to those skilled in the art. Other elements of the virtual concatenation circuitry 112 can be modified in a similar manner.

In the illustrative embodiment, it is also preferable to configure the FIG. 4 virtual concatenation circuitry such that the read pointer of the read data controller 304 to a given one of the FIFO buffers $310_i$ is delayed by at least N-R bytes relative to a write pointer of the write data controller 302, where $N=2^n$, and as noted above n is a function of clock frequency variation and allowable drift in at least a portion of the network.

The present invention in the illustrative embodiment described above provides a pointer generation algorithm that overcomes the previously-described difficulties associated with repackaging of virtual concatenation traffic into an aligned virtual concatenation stream.

An important advantage of the example pointer generation algorithm in the context of the illustrative embodiment is that it avoids or alleviates the above-described problem of overflow or underflow in the SPE data buffer. This example algorithm thus accounts for both the clock source differences present in a typical SONET network as well as the diverse routing which is characteristic of virtual concatenation applications.

The pointer generation techniques described herein can be implemented at least in part in the form of one or more software programs. As mentioned above, such programs may be stored in a memory of a network element 110 and executed by a processor of that element.

The pointer generation techniques described herein can also or alternatively be implemented at least in part in the form of one or more integrated circuits, for example, an integrated circuit having a processor and a memory, and associated with a network element 110.

Although particularly well-suited for use in a network element or other processing device configured to repackage a given VC data stream into a delay compensated VC data stream, the invention can be implemented in a variety of other types of processing devices.

As indicated previously, the above-described embodiment of the invention is intended to be illustrative only. For example, although the illustrative embodiment implements the invention at least in part in read and write data controllers of a delay compensation element, the invention can be implemented using other arrangements of hardware and software. In addition, alternative pointer generation algorithms in accordance with the invention may utilize different counter configurations or reset values for one or more of the individual member streams, and different types of processing logic. These and numerous other alternative embodiments within the scope of the following claims will be apparent to those skilled in the art.

What is claimed is:

1. An apparatus for use in implementing virtual concatenation operations in a data communication network, the apparatus comprising:
   a network element comprising virtual concatenation circuitry;
   the virtual concatenation circuitry being operative: (i) to maintain, for each of a plurality of member streams of a virtual concatenation stream, a corresponding counter which tracks pointer adjustments for that member stream; and (ii) to generate pointers based on values of the counters so as to substantially equalize incoming and outgoing pointer adjustments for the member streams at the network element;

wherein the virtual concatenation circuitry further comprises:

a data buffer; and a delay compensation element coupled to a data buffer, the delay compensation element comprising a write data controller and a read data controller;

wherein the data buffer comprises a set of buffers having a buffer for each of the member streams, a given one of the data buffers being coupled between a corresponding data output of the write data controller and a corresponding data input of the read data controller; and wherein each of the counters has an input coupled to a counter control output of the write data controller and an output coupled to a count input of the read data controller, and further wherein each of the counters has an additional input coupled to a counter control output of the read data controller.

2. The apparatus of claim 1 wherein the counter for a given one of the plurality of member streams is incremented each time that stream has an incoming pointer increment, and decremented each time that stream has an incoming pointer decrement.

3. The apparatus of claim 1 wherein the counter for a given one of the plurality of member streams is decremented each time that stream has an incoming pointer increment, and incremented each time that stream has an incoming pointer decrement.

4. The apparatus of claim 2 wherein when the counter values for the plurality of member streams are all greater than a specified threshold, an associated outgoing pointer is incremented and the corresponding counter values for the member streams are all decremented.

5. The apparatus of claim 4 wherein the specified threshold corresponds to a reset value established for the corresponding counters.

6. The apparatus of claim 2 wherein when the counter values for the plurality of member streams are all less than a specified threshold, an associated outgoing pointer is decremented and the corresponding counter values for the member streams are all incremented.

7. The apparatus of claim 6 wherein the specified threshold corresponds to a reset value established for the corresponding counters.

8. The apparatus of claim 3 wherein when the counter values for the plurality of member streams are all greater than a specified threshold, an associated outgoing pointer is decremented and the corresponding counter values for the member streams are all incremented.

9. The apparatus of claim 3 wherein when the counter values for the plurality of member streams are all less than a specified threshold, an associated outgoing pointer is incremented and the corresponding counter values for the member streams are all decremented.

10. An apparatus for use in implementing virtual concatenation operations in a data communication network, the apparatus comprising:

a network element comprising virtual concatenation circuitry;

the virtual concatenation circuitry being operative: (i) to maintain, for each of a plurality of member streams of a virtual concatenation stream, a corresponding counter which tracks pointer adjustments for that member stream; and (ii) to generate pointers based on values of the counters so as to substantially equalize incoming and outgoing pointer adjustments for the member streams at the network element;

wherein at least one of the counters has a reset value R which is a function of N, where $N=2^n$, and n is a function of clock frequency variation and allowable drift in at least a portion of the network.

11. The apparatus of claim 10 wherein the reset value R is given by $(N/2)-1$.

12. The apparatus of claim 10 wherein the reset value R is given by $N/2$.

13. An apparatus for use in implementing virtual concatenation operations in a data communication network, the apparatus comprising:

a network element comprising virtual concatenation circuitry;

the virtual concatenation circuitry being operative: (i) to maintain, for each of a plurality of member streams of a virtual concatenation stream, a corresponding counter which tracks pointer adjustments for that member stream; and (ii) to generate pointers based on values of the counters so as to substantially equalize incoming and outgoing pointer adjustments for the member streams at the network element;

wherein the virtual concatenation circuitry further comprises:

a data buffer; and a delay compensation element coupled to a data buffer, the delay compensation element comprising a write data controller and a read data controller;

wherein the data buffer comprises a set of buffers having a buffer for each of the member streams, a given one of the data buffers being coupled between a corresponding data output of the write data controller and a corresponding data input of the read data controller; and wherein the virtual concatenation circuitry is configured such that a read pointer of the read data controller is delayed by at least about N-R bytes relative to a write pointer of the write data controller, where R denotes a reset value of one or more of the counters, $N=2^n$, and n is a function of clock frequency variation and allowable drift in at least a portion of the network.

14. A method for use in implementing virtual concatenation operations in a network element of a data communication network, the method comprising:

maintaining, for each of a plurality of member streams of a virtual concatenation stream, a corresponding counter which tracks pointer adjustments for that member stream; and generating pointers based on values of the counters so as to substantially equalize incoming and outgoing pointer adjustments for the member streams at the network element;

wherein the maintaining and generating steps are implemented in virtual concatenation circuitry that further comprises:

a data buffer; and a delay compensation element coupled to a data buffer, the delay compensation element comprising a write data controller and a read data controller;

wherein the data buffer comprises a set of buffers having a buffer for each of the member streams, a given one of the data buffers being coupled between a corresponding data output of the write data controller and a corresponding data input of the read data controller; and wherein each of the counters has an input coupled to a counter control output of the write data controller and an output coupled to a count input of the read data controller, and further wherein each of the counters has an additional input coupled to a counter control output of the read data controller.

15. An integrated circuit configured for implementing virtual concatenation operations in a data communication network, the integrated circuit comprising:

virtual concatenation circuitry comprising a data buffer and a delay compensation element coupled to the data buffer;

the virtual concatenation circuitry being operative: (i) to maintain, for each of a plurality of member streams of a virtual concatenation stream, a corresponding counter which tracks pointer adjustments for that member stream; and (ii) to generate pointers based on values of the counters so as to substantially equalize incoming and outgoing pointer adjustments for the member streams at the network element;

wherein the virtual concatenation circuitry further comprises:

a data buffer; and a delay compensation element coupled to a data buffer, the delay compensation element comprising a write data controller and a read data controller;

wherein the data buffer comprises a set of buffers having a buffer for each of the member streams, a given one of the data buffers being coupled between a corresponding data output of the write data controller and a corresponding data input of the read data controller; and wherein each of the counters has an input coupled to a counter control output of the write data controller and an output coupled to a count input of the read data controller, and further wherein each of the counters has an additional input coupled to a counter control output of the read data controller.

16. The apparatus of claim 10, wherein the counter value of the at least one counter is initialized to R.

17. The apparatus of claim 10, wherein the at least one counter comprises an n-bit counter and wherein $0<R<2^n-1$.

* * * * *